United States Patent [19]
Shibazaki

[11] Patent Number: 5,386,483
[45] Date of Patent: Jan. 31, 1995

[54] METHOD OF AND APPARATUS FOR PROCESSING IMAGE DATA TO PRODUCE ADDITIONAL REGIONS ON THE BOUNDARY OF IMAGE REGIONS

[75] Inventor: Hiroshi Shibazaki, Kyoto, Japan

[73] Assignee: Dainippon Screen Mfg. Co., Kyoto, Japan

[21] Appl. No.: 969,407

[22] Filed: Oct. 30, 1992

[30] Foreign Application Priority Data

Oct. 30, 1991 [JP] Japan ................. 3-311972

[51] Int. Cl.⁶ ............................ G06K 9/48
[52] U.S. Cl. ...................... 382/22; 382/17; 382/26
[58] Field of Search ............ 358/183, 80, 37; 395/135, 157, 22; 382/22, 27, 54, 17, 26, 19

[56] References Cited

U.S. PATENT DOCUMENTS

| | | | |
|---|---|---|---|
| 4,441,207 | 4/1984 | Lougheed et al. | 382/8 |
| 4,644,583 | 2/1987 | Watanabe et al. | 382/22 |
| 4,736,439 | 4/1988 | May | 382/54 |
| 4,776,025 | 10/1988 | Hosoda | 382/27 |
| 4,827,533 | 5/1989 | Tanaka | 382/54 |
| 4,856,074 | 8/1989 | Nagaoka | 382/22 |
| 4,868,884 | 9/1989 | Miyazaki et al. | 382/30 |
| 4,876,729 | 10/1989 | Wantanabe et al. | 382/22 |
| 4,962,542 | 10/1990 | Klees | 382/54 |
| 5,018,211 | 5/1991 | Jaffe et al. | 382/8 |
| 5,031,227 | 7/1991 | Raasch et al. | 382/22 |
| 5,038,383 | 8/1991 | Usumoto et al. | 382/16 |
| 5,050,227 | 9/1991 | Furusawa et al. | 382/54 |
| 5,091,967 | 2/1992 | Ohsawa | 382/22 |
| 5,131,058 | 7/1992 | Ting et al. | 382/47 |
| 5,172,423 | 12/1992 | France | 382/22 |
| 5,185,808 | 2/1993 | Cok | 382/1 |
| 5,185,809 | 2/1993 | Kennedy et al. | 382/6 |

FOREIGN PATENT DOCUMENTS

| | | |
|---|---|---|
| 357407 | 7/1990 | European Pat. Off. . |
| 445066 | 4/1991 | European Pat. Off. . |
| 4-172770 | 6/1992 | Japan . |
| 2213340 | 9/1989 | United Kingdom . |

OTHER PUBLICATIONS

European Search Report, Jul. 1, 1993.

*Primary Examiner*—Yon J. Couso
*Attorney, Agent, or Firm*—Ostrolenk, Faber, Gerb & Soffen

[57] ABSTRACT

The present invention forms overlapping regions on the boundaries of neighboring image regions in a block copy image. In the method of the invention, region numbers are allocated to separate image regions in an original image, and overlapping regions or frame regions of a predetermined width are created on the boundaries of the neighboring image regions while alternately applying an eight-neighbor window and a four-neighbor window (S52 and S57 ). Each window includes a center pixel and neighboring pixels with a predetermined priority. Region numbers are allocated to the frame regions based on the region numbers of the center pixel and the neighboring pixels and on the priorities. The color of each frame region is determined according to a predetermined method, which depends on printing types such as offset printing and gravure printing. Color components of each frame region are determined according to the color of the target frame region and the color of another frame region that is neighbor to the target frame region across the boundary of the original image regions.

10 Claims, 16 Drawing Sheets

Fig. 5
| COLOR NUMBER Nc | Hy | Hm | Hc | Hk |
|---|---|---|---|---|
| 10 | 0 | 0 | 0 | 0 |
| 11 | 100 | 100 | 0 | 0 |
| 12 | 0 | 100 | 100 | 0 |
|  |  |  |  |  |
|  |  |  |  |  |
4: COLOR PALLET
Fig. 7 (a)
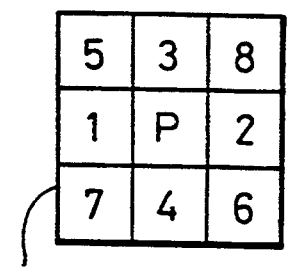
W 8 : EIGHT-NEIGHBOUR WINDOW
Fig. 7 (b)
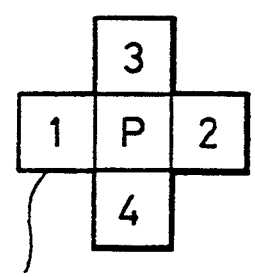
W 4 : FOUR-NEIGHBOUR WINDOW

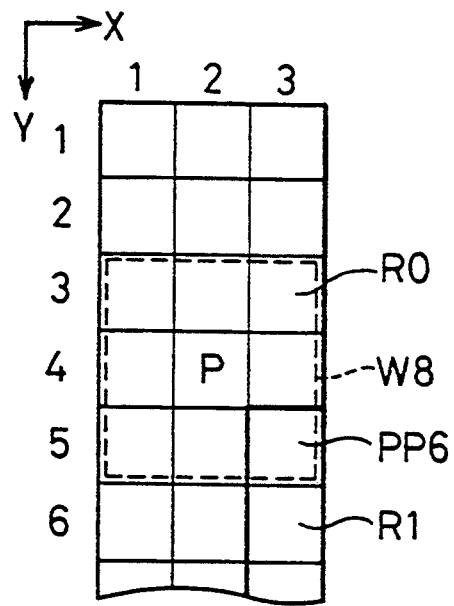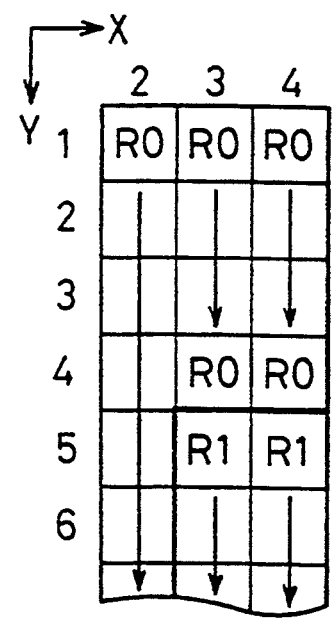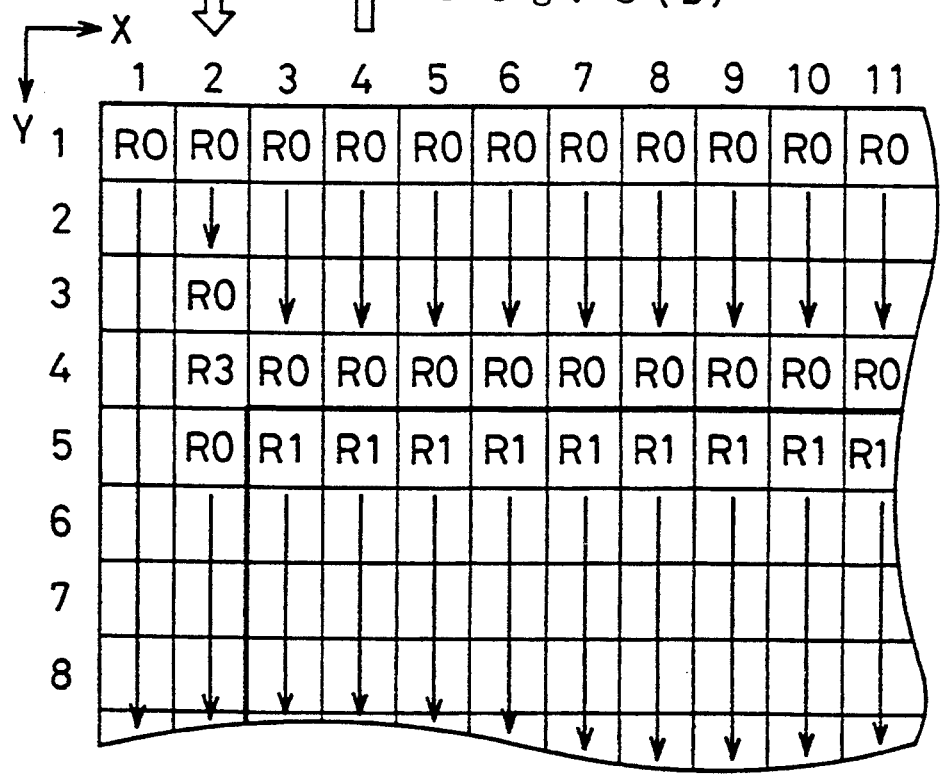

RT: FRAME REGION NUMBER TABLE

| FRAME REGION NUMBER | ORIGINAL REGION NUMBER | CONTACT NUMBER |
|---|---|---|
| 3 | 0 | 1 |
| 4 | 1 | 0 |
| 5 | 0 | 2 |
| 6 | 2 | 0 |
| 7 | 1 | 2 |
| 8 | 2 | 1 |

FCT: FRAME REGION COLOR DATA TABLE

| FRAME NUMBER | COLOR NUMBER OF ORIGINAL REGION | COLOR NUMBER OF CONTACT REGION |
|---|---|---|
| 3 | 10 | 11 |
| 4 | 11 | 10 |
| 5 | 10 | 12 |
| 6 | 12 | 10 |
| 7 | 11 | 12 |
| 8 | 12 | 11 |

Fig. 16    COLOR COMPONENTS OF EACH REGION (IN OFFSET PRINTING)

| TYPES | REGION NAME | COLOR NUMBER | HALFTONE DOT AREA RATE | | | | COLOR NUMBER OF ORIGINAL REGION | COLOR NUMBER OF CONTACT REGION | ESTIMATED VALUE | | COLOR CHANGE REQUIRED |
|---|---|---|---|---|---|---|---|---|---|---|---|
| | | | Hy | Hm | Hc | Hk | | | EVo | EVc | |
| ORIGINAL REGION | R0 | 10 | 0 | 0 | 0 | 0 | | | | | |
| | R1 | 11 | 100 | 100 | 0 | 0 | | | | | |
| | R2 | 12 | 0 | 50 | 100 | 0 | | | | | |
| FRAME REGION | R3 | 10 | (SAME AS REGION R0) | | | | 10 | 11 | 0 | 22.4 | No |
| | R4 | 21 | 100 | 100 | 0 | 0 | 11 | 10 | 22.4 | 0 | Yes |
| | R5 | 10 | (SAME AS REGION R0) | | | | 10 | 12 | 0 | 56 | No |
| | R6 | 22 | 0 | 50 | 100 | 0 | 12 | 10 | 56 | 0 | Yes |
| | R7 | 11 | (SAME AS REGION R0) | | | | 11 | 12 | 22.4 | 56 | No |
| | R8 | 23 | 100 | 100 | 100 | 0 | 12 | 11 | 56 | 22.4 | Yes |

Fig. 17

CT: COLOR NUMBER TABLE

| REGION NUMBER Nr | COLOR NUMBER Nc |
|---|---|
| 0 | 10 |
| 1 | 11 |
| 2 | 12 |
| 3 | 10 |
| 4 | 21 |
| 5 | 10 |
| 6 | 22 |
| 7 | 11 |
| 8 | 23 |

Fig. 18

4: COLOR PALLET

| COLOR NUMBER Nc | Hy | Hm | Hc | Hk |
|---|---|---|---|---|
| 10 | 0 | 0 | 0 | 0 |
| 11 | 100 | 100 | 0 | 0 |
| 12 | 0 | 50 | 100 | 0 |
| 21 | 100 | 100 | 0 | 0 |
| 22 | 0 | 50 | 100 | 0 |
| 23 | 100 | 100 | 100 | 0 |

Fig. 20(a)
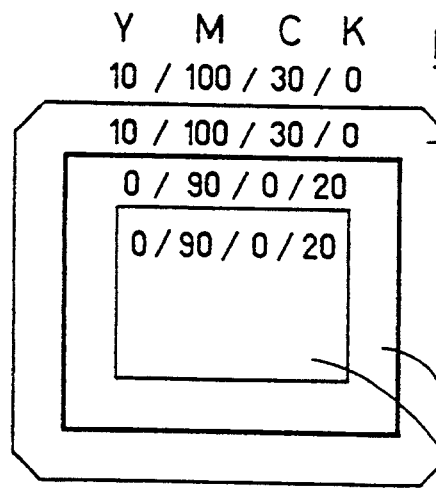
Fig. 20(b)
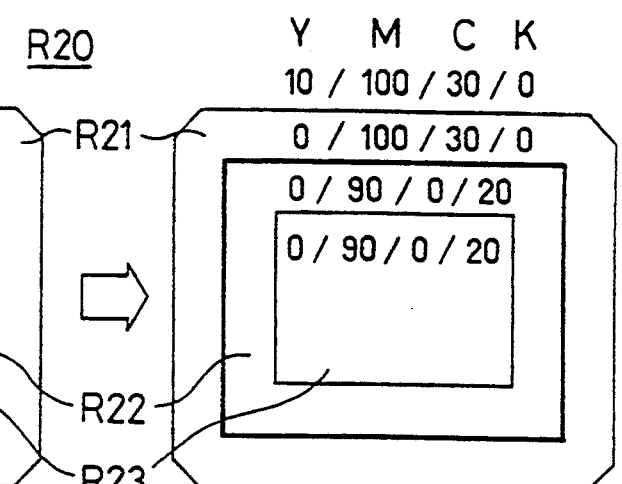
Fig. 20(c)
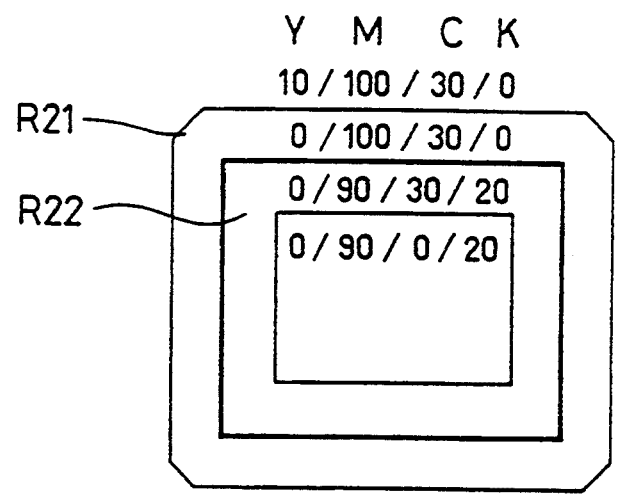

IRT

| Nr(2)=Nr(4) |
|---|
| Nr(5)=Nr(6) |

METHOD OF AND APPARATUS FOR PROCESSING IMAGE DATA TO PRODUCE ADDITIONAL REGIONS ON THE BOUNDARY OF IMAGE REGIONS

BACKGROUND OF THE INVENTION

1. Field of the Invention

The present invention relates to a method of and an apparatus for processing image data representing an original image including plural image regions, and more particularly to a technique to produce overlapping regions on the boundary of the plural image regions in the original image.

2. Description of the Related Art

In ordinary color printing, four primary color inks, that is, yellow, magenta, cyan, and black (YMCK), are applied to a printing paper with four printing plates.

Although the color printing machine has high accuracy and precision, misalignment of the printing plates, Which is between plus and minus about 0.05 is inevitable in actual printing. The misalignment, in many cases, causes undesirable blank regions or dropouts, thus lowering the quality of the printed matter.

In order to prevent the quality deterioration due to the misalignment of the printing plates, so-called 'overlapping' process is executed. The overlapping process modifies the shapes of two adjacent image regions and creates an overlapping region on the boundary of adjacent image regions so that the adjacent image regions partially overlap with each other on the boundary. The color of the overlapping region is selected on the basis of the adjacent image regions to make the overlapping region unobtrusive.

However, it is not always easy to determine the shape of the overlapping region, especially for an image including a large number of image regions where many overlapping regions are to be made and where the boundaries of the overlapping regions are complicated.

An improved overlapping technique therefore has been strongly demanded which can determine the shape of each overlapping region by relatively simple steps. In order to attain the improved overlapping technique, it has been desired to develop a technique to easily produce additional regions, which are to be overlapping regions, on the boundaries of image regions.

SUMMARY OF THE INVENTION

An object of the present invention is to produce an additional region of a desirable width on the boundary of each pair of adjacent image regions in an original image.

According to the present invention, the foregoing and other objects are attained at least partly by a method of processing image data representing an original image including a plurality of image regions to create additional regions on the boundary between each pair of the plurality of image regions with the aid of a computer. The method comprises the steps of: (a) allocating a region number to each of the plurality of image regions; (b) preparing a neighbour window consisting of a plurality of pixels, each of which is allocated a predetermined priority; and (c) while successively shifting the neighbouring window on the original image, allocating a new region number different from the region numbers of the plurality of image regions to a center pixel located at the center of the neighbour window according to comparison between the region number of the center pixel and the region numbers of neighbour pixels included in the neighbour window. As a result, a pair of additional regions each having the new region numbers are formed on a respective side of the boundary between each pair of the plurality of image regions.

Preferably, the step (c) comprises the step of: (d) allocating the new region number to the center pixel on the conditions that the center pixel is located in one of the plurality of image regions and that the region number of at least one of the neighbour pixels in the neighbour window is different from the region number previously allocated to the center pixel.

In the preferred embodiment, the neighbour window includes a eight-neighbour window and a four-neighbour window. The method further con, rises the step of: (e) repeatedly executing the step (c) while alternatively using the eight-neighbour window and the four-neighbour window, to thereby form the pair of additional regions each having a width determined by the number of the repetition.

The step (c) further comprises the step of: (f) allocating the new frame region number to the center pixel on the condition that the region number of a first neighbour pixel which has the highest priority among the neighbour pixels having a different region number from the region number previously allocated to the center pixel is equal to one of the region numbers originally allocated to the plurality of image regions, while maintaining the region number previously allocated to the center pixel on the condition that the region number of the first neighbour pixel is different from the region numbers originally allocated to the plurality of image regions.

The step (a) further comprises the step of determining color components of each of the plurality of image regions. The method further comprises the step of: (g) correcting the color components of the pair of additional regions according to comparison between the color components of the pair of additional regions.

The step (g) comprises the step of: (h) evaluating color strength of an original image region of each of the pair of additional regions according to a prescribed evaluation equation; and (i) correcting the color components of a first region of the pair of additional regions whose color strength is greater than a second region of the pair of additional regions.

The step (i) comprises the step of: (j) comparing two corresponding values of each color component for the pair of additional regions, and selecting the larger one of the two corresponding values as a corrected value of each color component for the first region.

The present invention is also directed to an apparatus for processing image data representing an original image including a plurality of image regions to create additional regions on the boundary between each pair of the plurality of image regions. The apparatus comprises: a first image memory for memorizing the image data; a second image memory for memorizing at least a part of the image data on a predetermined number of scanning lines. The number of scanning lines corresponds to a width of a prescribed neighbour window consisting of a plurality of pixels, each of which is allocated a predetermined priority. The apparatus further comprises data processing means for processing the image data in the first and second image memory. The data processing means includes: region number allocation means for allocating a region number to each of the plurality of image regions; data transfer means for reading out the at least a part of the image data from the first image memory to write in the second image memory; means for successively shifting the neighbour window on the original image to apply the neighbour window to the image data in the second image memory, the image data in the second image memory being revised at least partly by the data transfer means every time the neighbour window reaches an end of each scanning line; and additional region forming means for allocating a new region number different from the region numbers of the plurality of image regions to a center pixel located at the center of the neighbour window according to comparison between the region number of the center pixel and the region numbers of neighbour pixels included in the neighbour window, to thereby form a pair of additional regions each having the new region numbers on a respective side of the boundary between each pair of the plurality of image regions.

These and other objects, features, aspects, and advantages of the present invention will become more apparent from the following detailed description of preferred embodiments with the accompanying drawings.

BRIEF DESCRIPTION OF THE DRAWINGS

FIG. 5 schematically shows the contents of a color pallet;

FIGS. 7(a) and 7(b) illustrate neighbour windows used for creation of frame regions;

FIGS. 8(a) through 8(c) illustrate the steps of frame-region creation with the process windows;

FIG. 16 shows a table for determining color components of frame regions;

FIG. 17 illustrates the contents of the color number table CT after creation of frame regions;

FIG. 18 illustrates the contents of the color pallet after creation of frame regions;

FIGS. 20(a) through 20(c) show, as another example, the color components of the frame regions in the process of determining the color of each frame region in gravure printing;

FIGS. 22 through 25 show the region segmentation process; and

FIG. 26 shows an identical region table.

DESCRIPTION OF THE PREFERRED EMBODIMENT

Figure 1:
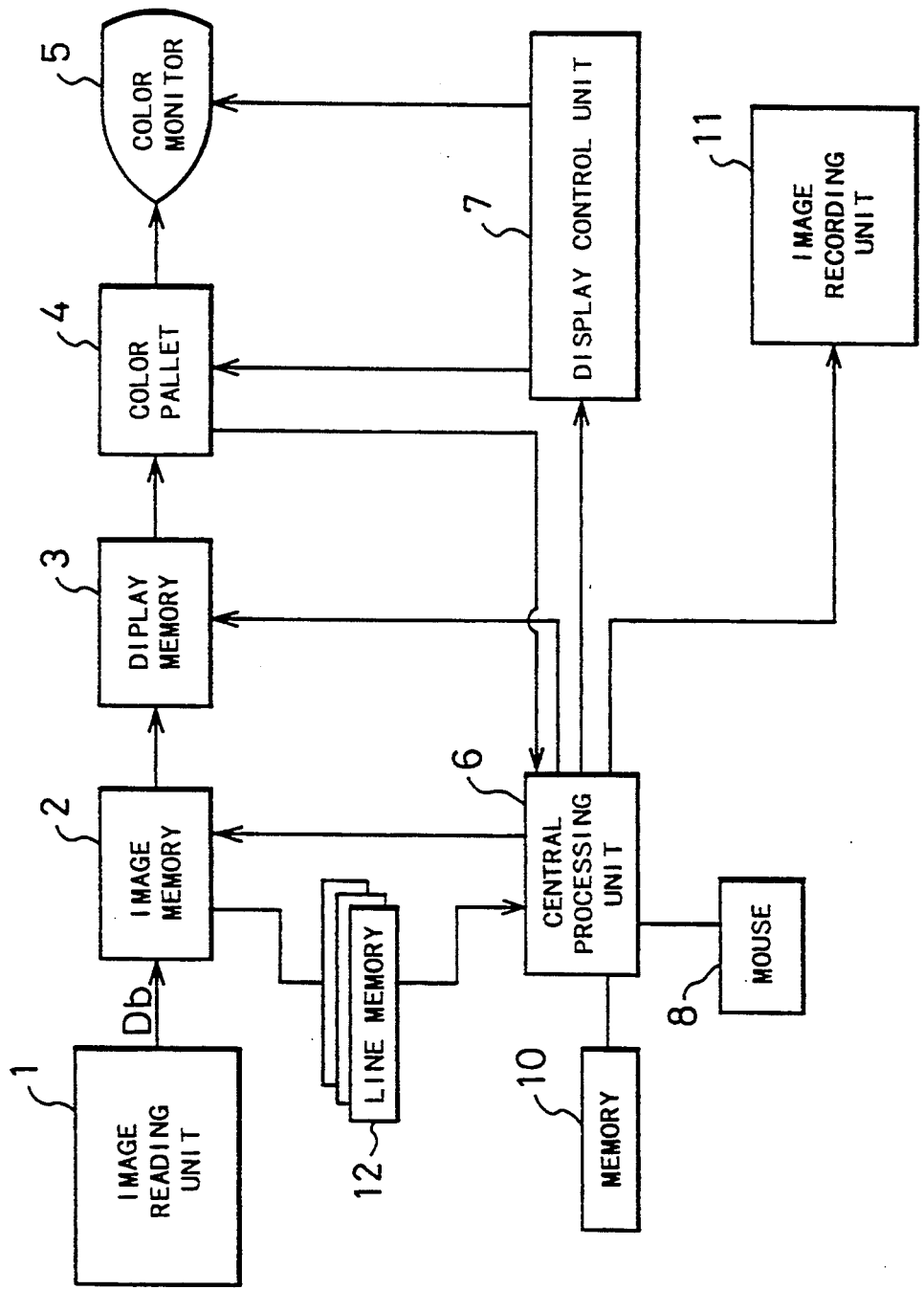
FIG. 1 is a block diagram showing a structure of an image processing apparatus used for overlapping process as an embodiment of the invention.

FIG. 1 is a block diagram showing the structure of an image processing apparatus used for overlapping process as an embodiment of the invention. The apparatus includes the following elements:

(a) an image reading unit 1, for example, a scanner of a flat-bed type, for scanning a block copy image to generate a binary image representing the block copy image;

(b) an image memory 2 for storing image data representing images to be processed;

(c) a display memory 3 for storing bit map data of an image to be displayed on a color monitor 5, where the bit map data includes color number components allocated to each pixel and is initialized every time when the display conditions are changed;

(d) a color pallet 4 for storing the relationship between the color number of each pixel and the color component or dot percent of each primary color (YMCK), and for converting the color number to the dot percent, and also for converting the dot percent to display color data of red (R), green (G), and blue (B);

(e) a color monitor 5 for displaying an image to be processed or a resultant image after overlapping process;

(f) a central processing unit 6 for controlling each element of the image processing apparatus, and for executing region segmentation process (described later), management of a color number table, and color allocation for overlapping regions according to software programs;

(g) a display control unit 7 for controlling display of an image on the color monitor and shifting a cursor on the color monitor 5 according to the movement of a mouse 8;

(h) a mouse 8 used to select required data or an image region out of plural image regions of an image displayed on the color monitor;

(i) an auxiliary memory 10 for temporarily storing information required in various data processing;

(j) an image recording unit 11, such as a recording scanner, for recording a resultant image after overlapping process on a recording medium such as photosensitive film; and (k) line memories 12 for temporarily storing image data representing three s canning lines in overlapping process.

Figure 2:
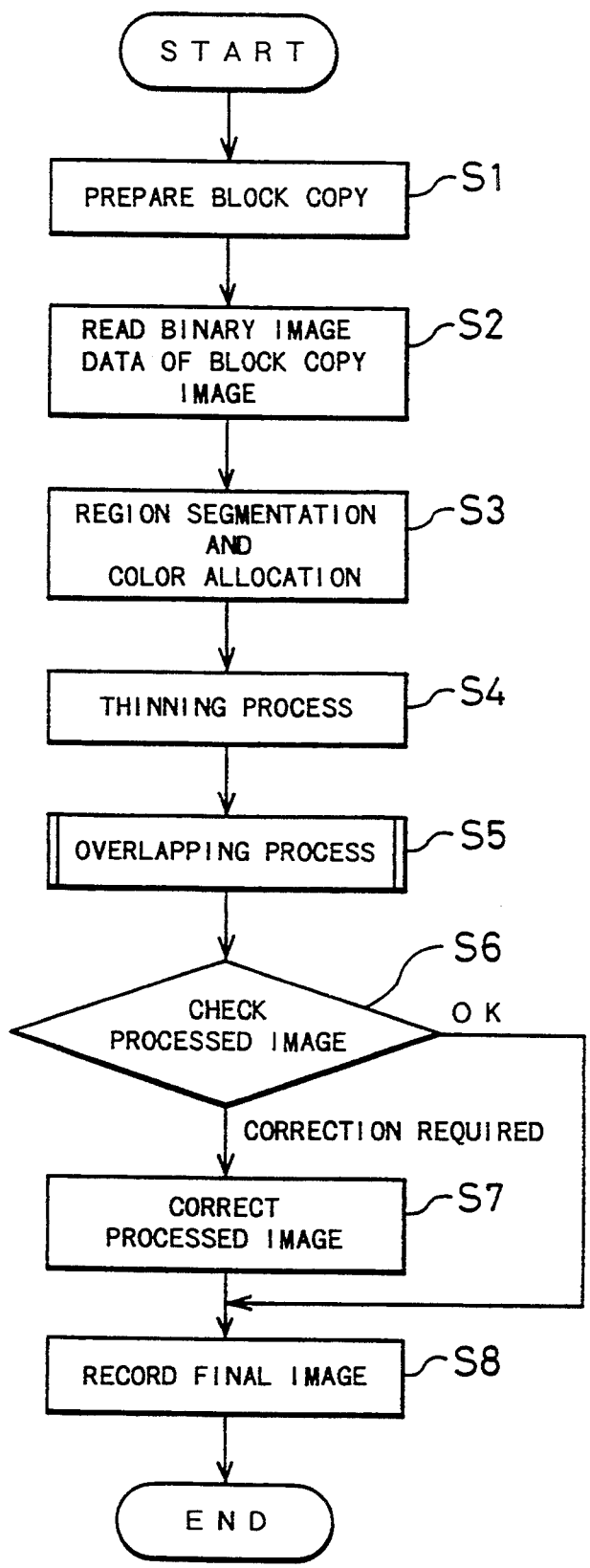
FIG. 2 is a flowchart showing the steps of the whole overlapping process.

FIG. 2 is a flowchart showing the procedure of the overlapping process according to the present invention.

Figures 3, 4:
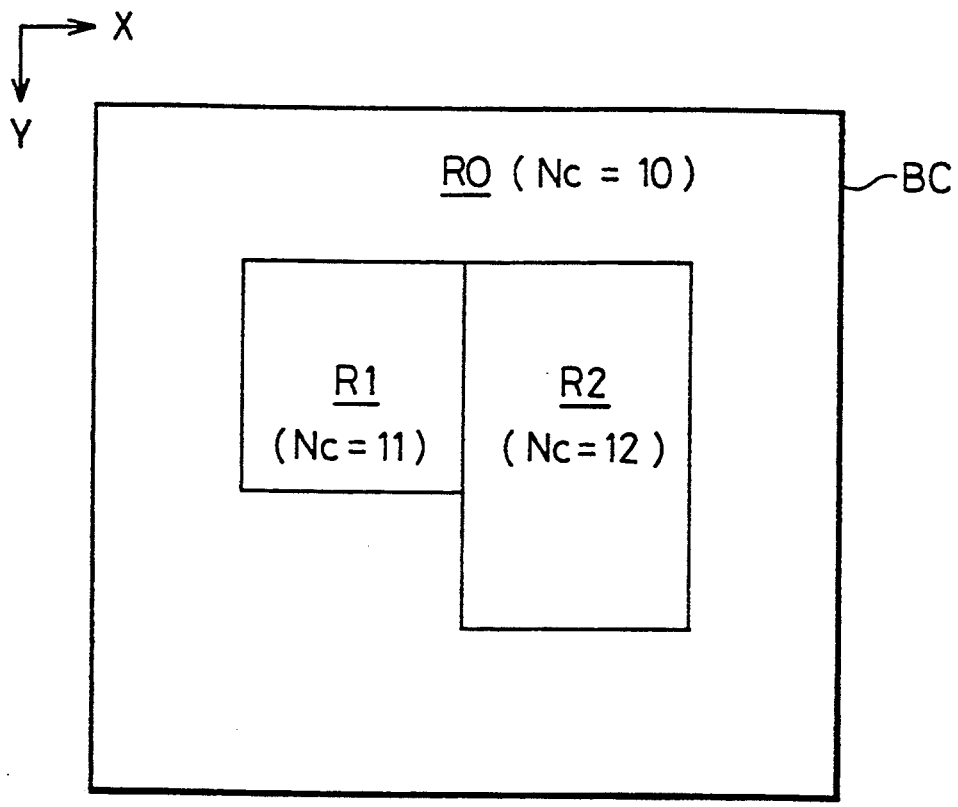
FIG. 3 illustrates a target image to be processed.
FIG. 4 schematically shows the contents of a color number table CT.

At step S1, characters and figures are arranged on a layout sheet to make a block copy. FIG. 3 is a plan view showing a block copy image BC. The block copy image BC includes three image regions R0, R1, and R2. The rectangle image regions R1 and R2 are defined by black solid lines on a white layout sheet, and the image region R3 covers the rest of the layout sheet.

At step S2, the image reading unit 1 scans the block copy image BC to generate binary image data Db. The binary image data Db includes run-length data and indicates the color (black or white in this case) of each pixel in the block copy image BC.

The program then proceeds to step S3 at which each separate image region in the block copy image BC is allocated a region number and colored. This step includes region segmentation process and color allocation process.

In the region segmentation process, image regions which are separated by a boundary between a black region and a white region are identified as separate image regions, and different region numbers Nr are allocated to the separate image regions. For example, the block copy image of FIG. 3 is separated into three white image regions R0, R1, and R2 and one black keyline region, and the region numbers Nr=0, 1, and 2 are allocated to the white image regions R0, R1, and R2, respectively. Details of the region segmentation process will be discussed later in detail.

In the color allocation process after the region segmentation, an operator specifies a color number Nc indicating color for each of the separate image regions R0, R1, and R2 while watching the block copy image BC displayed on the color monitor 5, and also specifies halftone dot area rates or dot percents Hy, Hm, Hc, and Hk of the four primary colors corresponding to each color number Nc. In this specification, the halftone dot area rates Hy, Hm, HC, and Hk (%) indicated by the color number NC are expressed as follows:

Nc[Nc]=(Hy, Hm, Hc, Hk)

The following are examples of the color components of the three image regions R0, R1, and R2, to which the color numbers 10, 11, and 12 are allocated, respectively.

Nc[10]=(0, 0, 0, 0)

Nc[11]=(100, 100, 0, 0)

Nc[12]=(0, 100, 100, 0)

The black keyline region can be assigned any color number because the color number of the black keyline region is not used in the following process.

The following data are obtained as a result of the processing at step S3:

(1) Image data composed of run-length data including: the region numbers Nr allocated to the separate image regions of the block copy image BC; and the respective run lengths of the region numbers Nr in a primary scanning direction Y;

(2) A color number table CT shown in FIG. 4 indicating the relationship between the region numbers Nr and the color numbers Nc; and (3) The color pallet 4 shown in FIG. 5 indicating the halftone dot area rates Hy, Hm, Hc, and Hk corresponding to each color number Nc.

The image data and the color number table CT is stored in the image memory 2.

At step S4, the central processing unit 6 executes the thinning processing to eliminate the black keyline region, to thereby make the block copy image BC consisting of the three separate image regions R0, R1, and R2 without the keyline. In the resultant block copy image BC, the image regions R0, R1, and R3 are in direct contact with each other. The thinning processing is described in U.S. Pat. Nos. 4,931,861 and 4,922,332, the disclosure of which is incorporated herein by reference.

Figure 6:
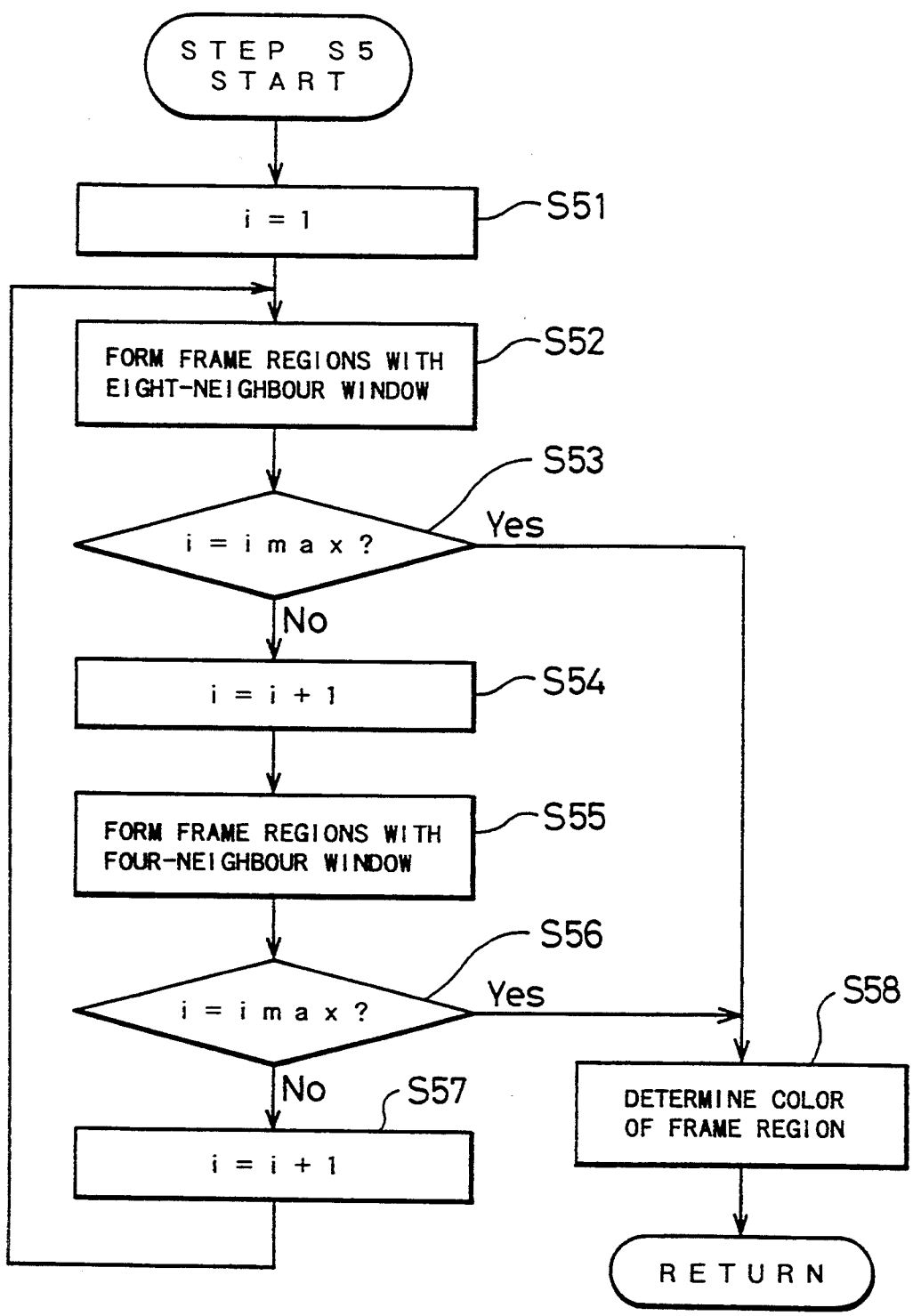
FIG. 6 is a flowchart showing details of the overlapping process including creation of frame regions.

At step S5, overlapping process is executed over the whole block copy image BC. FIG. 6 is a flowchart showing details of the overlapping process. At steps S51 through S57, a pair of additional regions are formed on the boundary of each pair of adjacent image regions while alternately using an eight-neighbour window and a four-neighbour window, and then a color of each additional region is determined at step S58.

FIG. 7(a) shows the eight-neighbour window W8, where numbers in the eight neighbour pixels surrounding the center pixel P indicate predetermined priorities. FIG. 7(b) shows the four-neighbour window W4, where numbers in the four horizontal and vertical neighbour pixels also indicate predetermined priorities.

At step S51 of FIG. 6, a parameter "i" indicating a width of additional regions-to-be-made is initialized to one.

At step S52, additional regions of one pixel width (the additional regions will be hereinafter referred to as "frame regions") are created on the respective side of each boundary of the adjacent image regions R0 through R2 while using the eight-neighbour window W8. FIGS. 8(a) through 8(c) illustrate the contents of the processing at step S52.

At step S52, the central processing unit 6 reads out image data corresponding to three scanning lines in the block copy image BC from the image memory 2 and stores the image data in the line memories 12. FIG. 8(a) shows an example of image data stored in the line memories 12. The eight-neighbour window W8 is successively moved by one pixel in the primary scanning direction Y on the three scanning lines. At each position of the window, the central processing unit 6 compares the region number Nr of the center pixel P with those in the eight neighbour pixels so as to determine whether the center pixel P is to be specified as a pixel in a frame region. The center pixel P is specified as a pixel in a frame region if the following two conditions (a1) and (a2) are satisfied:

Condition (a1): The center pixel P is located in one of the original image regions R0, R1, and R2 of the block copy image Be. In other words, the region number Nr of the center pixel P is equal to 0, 1, or 2.

Condition (a2): The region number Nr of at least one neighbour pixel is different from the region number Nr of the center pixel P.

The method of allocating a new region number to the frame region (hereinafter referred to as "frame region number") is as follows:

(b1) When the region number Nr of a specific neighbour pixel which has the highest priority (FIG. 7(a)) among those neighbour pixels having a different region number from that of the center pixel P is equal to 0, 1, or 2, that is, different from the region numbers allocated to the original image regions in the block copy image BC, a new frame region number is allocated to the center pixel P while the new frame region number is obtained by increasing the current maximum region number by one.

(b2) When the region number Nr of the specific neighbour pixel is not less than 3, that is, greater than the maximum region number allocated to the original image regions in the block copy image BC, the region number of the specific neighbour pixel is used as the frame region number of the center pixel P.

Suppose that the center pixel P of the eight-neighbour window W8 is located at the coordinates (2, 4) as shown with the broken line in FIG. 8(a). The center pixel P is included in the image region R0, and a neighbouring pixel PP6 with the 6th priority (FIG. 7(a)) is included in another image region R1. Namely, the center pixel P has the region number Nr=0 while the surrounding pixel PP6 has the region number Nr=1. Since the above conditions (a1) and (a2) are both satisfied, the center pixel P at the coordinates (2, 4) is identified as a pixel in a frame region.

Figures 9, 10:
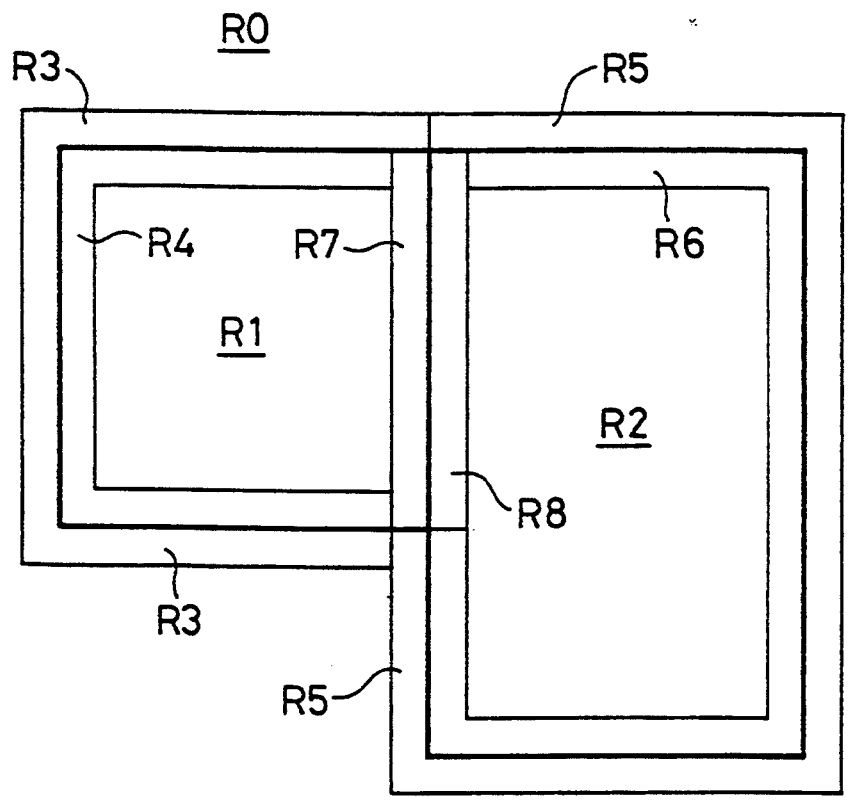
FIG. 9 schematically illustrates the contents of a frame region number table RT.
FIG. 10 schematically illustrates the frame regions created by the first processing with the process window.

Meanwhile, a new frame region number Nr=3 is allocated to the center pixel P according to the above method (b1). The central processing unit 6 then creates a frame region number table RT for registering the frame region numbers, the original region numbers, and the region number of the specific neighbour pixel having the highest priority (hereinafter referred to as "contact region number"). The frame region number table RT is stored in the auxiliary memory 10. FIG. 9 illustrates an example of the frame region number table RT. In the table RT of FIG. 9, frame region numbers 3 through 8 are allocated to frame regions R3 through R8 which are created at step S52 of FIG. 6.

The central processing unit 6 replaces the region number in the image memory 2 by the frame region number for the center pixel P of the window W8. FIG. 8(b) shows the image data stored in the image memory 2, in which the original region number of 0 (shown as R0) of the pixel at the coordinates (2, 4) is replaced by the frame region number of 3 (shown as R3).

While the region number is changed to the specified frame region number in the image data stored in the image memory 2, the region number of the same pixel is unchanged in the image data stored in the line memories 12. Accordingly, when the center pixel P of the eight-neighbour window W8 is shifted to the coordinates (2, 5), the frame region number at the coordinates (2, 5) is determined irrespective of the frame region number at the preceeding coordinates (2, 4).

After completion of the above processing on the first three scanning lines, the central processing unit 6 erases the image data representing the first scanning line (at X=1) in the line memories 12, and reads out the image data representing a next scanning line (at X=4) from the image memory 2 to store the image data in the line memories 12.

As described above, at step S52, frame regions are created at the boundaries of the adjacent image regions in the block copy image BC while the eight-neighbour window W8 is shifted along the scanning lines and while the set of three scanning lines is renewed one line at a time. FIG. 10 shows the frame regions R3 through R8 created by the first execution of step S52. Thick solid lines show the boundaries of the original image regions R0 through R2, and thin solid lines show the boundaries of the frame regions R3 through R8. Each of the frame regions R3 through R8 has the width of one pixel; however, the width is exaggerated in FIG. 10 for convenience of illustration.

The program then proceeds to step S53 of FIG. 6, at which the parameter "i" is compared with a maximum value $i_{max}$ predetermined by the operator. Here the maximum value $i_{max}$ expresses the width of the final frame regions in the number of pixels. When the parameter "i" is not equal to $i_{max}$, the program proceeds to step S54 at which the parameter "i" is incremented by one.

The program then goes to step S55, at which the same process as step S52 is executed with the four-neighbour window W4. The central processing unit 6 renews the image data corresponding to three scanning lines from the image memory 2 to the line memories 12; determines whether the center pixel P of the four-neighbour window W4 is to be identified as a pixel in a frame region based on the above conditions (a1) and (a2); and allocates a frame region number to the center pixel according to the method (b1) or (b2). At the time of step S55, the original image regions R0, R1, and R2 which have the region number Nr=0, 1, and 2 are already separated from one another by the frame regions R3 through R8 as shown in FIG. 10. Therefore when the center pixel P has the region number Nr=0, 1, or 2, its neighbour pixels always have the region numbers other than 0, 1, and 2. In other words, the frame region number is determined according to the method (b2) after the first execution of step S52.

Figure 11:
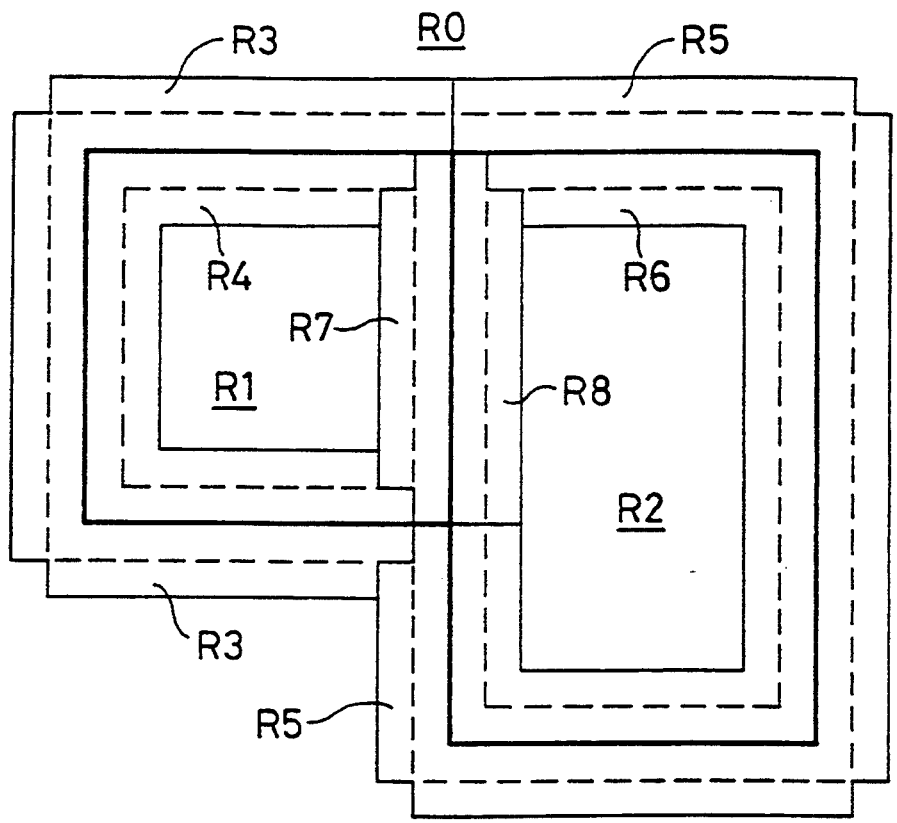
FIG. 11 schematically illustrates the frame regions created by the second processing with the process window.

FIG. 11 shows the frame regions R3 through R8 formed by the processing of step S55. The frame regions R3 through R8 of two-pixel width are thus formed by the processing of steps S52 and S55.

At step S56, the parameter "i" is compared with the maximum value $i_{max}$, and when "i" is not equal to $i_{max}$, the program goes to step S57 at which the parameter "i" is incremented by one and returns to step S52. The processing for forming the frame regions at steps S52 and S55 is repeated until the parameter "i" becomes equal to $i_{max}$.

Figure 12:
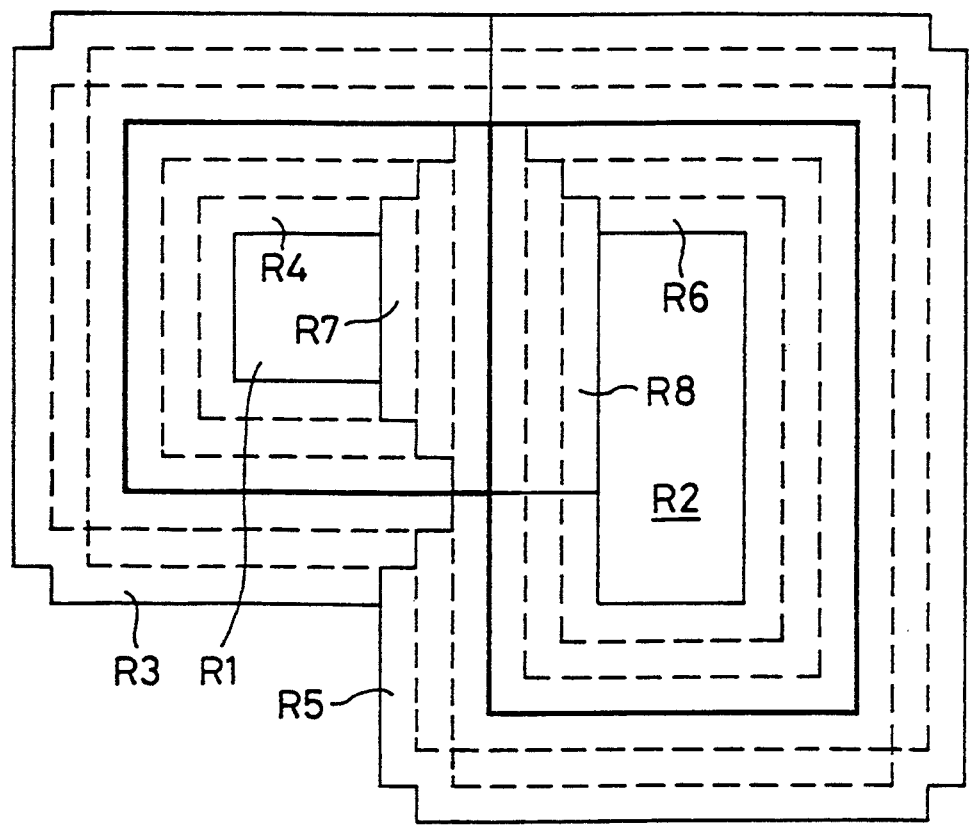
FIG. 12 schematically illustrates the frame regions created by the third processing with the process window.
Figure 13:
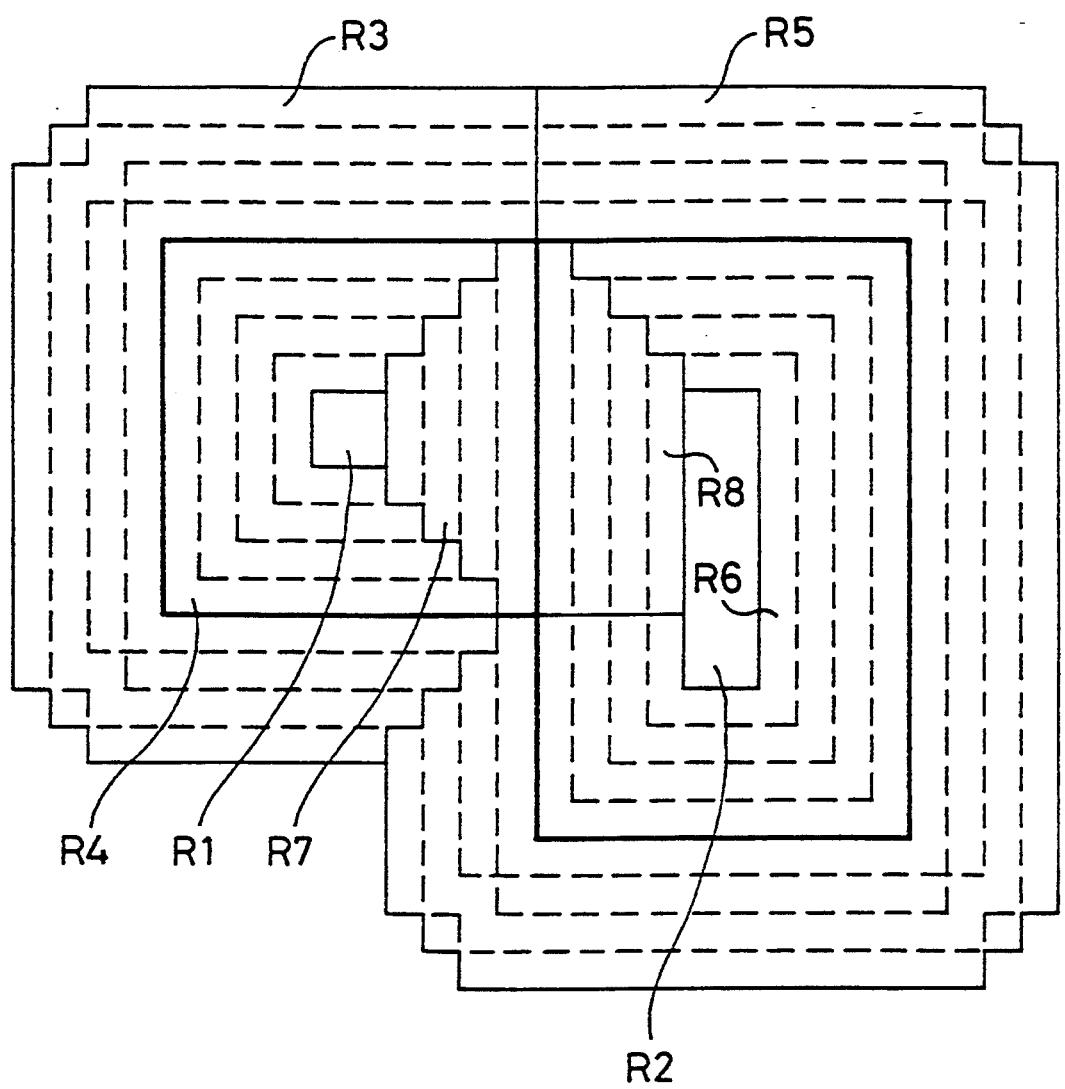
FIG. 13 schematically illustrates the frame regions created by the fourth processing with the process window.

FIGS. 12 and 13 respectively illustrate the frame regions R3 through R8 formed by the second execution of step S52 and the second execution of step S55.

Figures 14, 15:
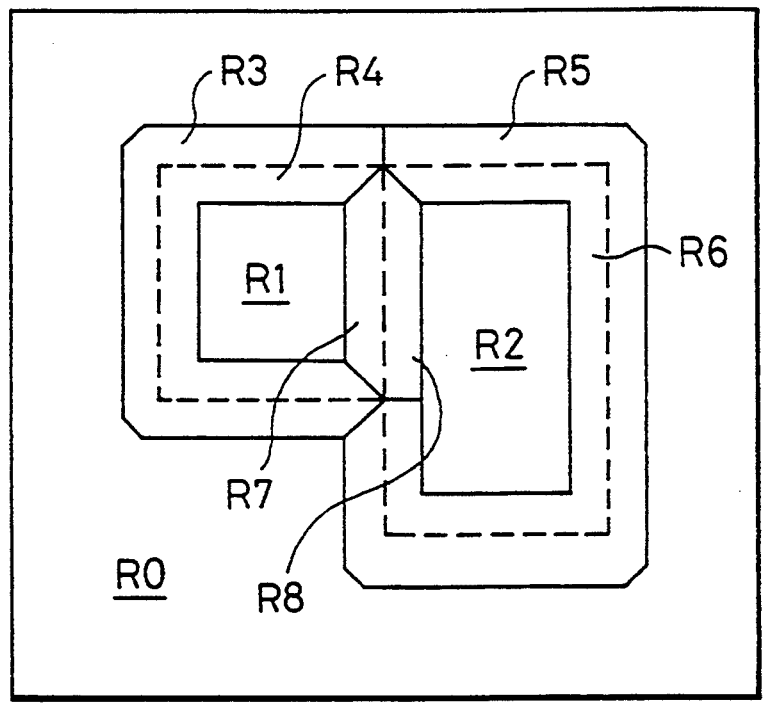
FIG. 14 shows a resultant block copy image including the frame regions of FIG. 13.
FIG. 15 illustrates the contents of a frame region color data table FCT.

Repeated execution of steps S52 through S57 until the parameter "i" becomes equal to $i_{max}$ forms the frame regions R3 through R8 of the desirable width ($=i_{max}$) on the boundaries of the image regions R0 through R2. FIG. 14 shows a realistic representation of a resultant block copy image including the frame regions of FIG. 13. The relatively complicated boundaries of the frame regions R3 through R8 are drawn with solid lines while the original boundaries are drawn with broken lines.

The program then goes to step S58 at which the central processing unit 6 determines the colors of the frame regions according to a method previously specified by the operator. Coloring of a certain frame region is based on the color components of the original image region R0, R1, or R2 of the certain frame region, and the color of the contact region R0, R1, or R2 which is adjacent to the certain frame region. The contact region is indicated by the contact region numbers of 0, 1, and 2 in the frame region number table RT shown in FIG. 9.

At step S58, the central processing unit 6 first creates a frame region color data table FCT shown in FIG. 15, in which the original region numbers and the contact region numbers in the frame region number table FT (FIG. 9) are converted to the corresponding color numbers. This conversion is based on the color number table CT (FIG. 4) stored in the image memory 2.

The procedure in determining the color of each frame region depends on the printing process. Some examples are given below.

A) Offset printing

In offset printing, the color of each frame region is determined so that misalignment of printing plates does not cause any dropout or blank region. A specific equation is used to evaluate color strength of the original region of the frame region and color strength of the contact region. When an evaluated color strength or color value EVo of the original region is greater than an estimated color value EVc of the contact region, the greater one of the dot percent of the original region and that of the contact region is selected as a corrected dot percent of the frame region for each of the four printing plates. On the other hand, when the color value EVo of the original region is no more than the color value EVc of the contact region, the dot percents of the original region are used as the dot percents of the frame region.

The equation to evaluate the color value EV is, for example, expressed as follows:

$$EV = Hk + 0.4Hc + 0.16Hm + 0.06Hy \qquad (1)$$

where Hk, Hc, Hm, Hy are dot percents of black, cyan, magenta, and yellow components, respectively.

FIG. 16 shows the color components, in dot percent, of the frame regions R3 through R8, which is determined based on the estimated color values EV.

In the frame regions R4, R6, and R8 whose color value EVo of the original region is greater than the color value EVc of the contact region, the greater dot percent of that of the original region and that of the contact region is selected as the dot percent of the frame region for each color component. On the contrary, in the frame regions R3, R5, and R7 whose color value EVo of the original region is no more than the color value EVc of the contact region, the dot percent of the original region is used as the dot percent of the frame region for each color component.

As shown in FIG. 16, new color numbers, for example, 21, 22, and 23, are allocated to the frame regions R4, R6, and R8 to which the color components are changed. The color number table CT of FIG. 4 is revised to that of FIG. 17. Meanwhile, the dot percents indicated by the new color numbers 21, 22, and 23 are registered in the color pallet 4 as shown in FIG. 18.

As shown in FIG. 18, the color numbers 11 and 21 indicate an identical color, and the color numbers 12 and 22 also indicate an identical color. The color numbers 11 and 12 may be allocated to the frame regions R4 and R6, respectively, instead of the color numbers 21 and 22.

B) Gravure printing

In gravure printing, some recording medium such as a plastic wrapping film is easy to expand and contract. Therefore it is desirable to reproduce a fine and clear image irrespective of the deformation of the recording medium. The color determination in gravure printing includes the following two steps to achieve this object.

At the first step, one of the four primary color components is left for each frame region while the other color components are omitted. In more concrete terms, the dot percent which has the highest priority among the color components whose dot percents are not equal to zero is maintained while the other color components set equal to zero.

The priority among the color components Y, M, C, and K is, for example, predetermined as follows:

Priority: Y<M<C<K

However, the dot percent of the color component having a relatively low priority is also kept intact in the frame region where the dot percent of the original region of the contact region, which is adjacent to the frame region, is not equal to zero.

Figure 19:
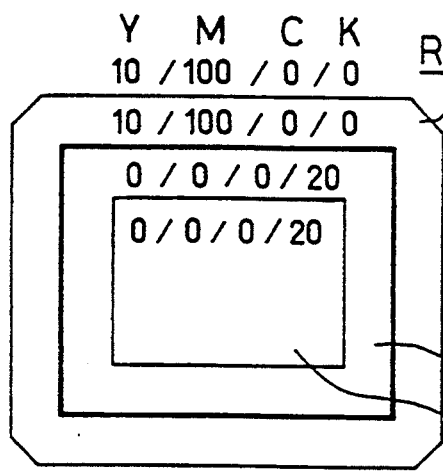
FIGS. 19(a) through 19(c) show, as one example, the color components of the frame regions in the process of determining the color of each frame region in gravure printing.
Figure 19:
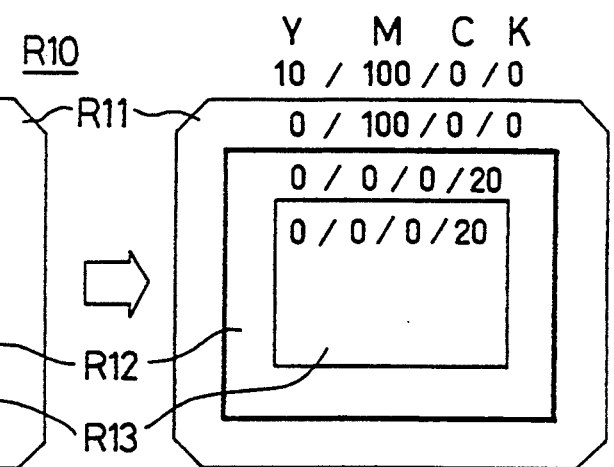
Figure 19:
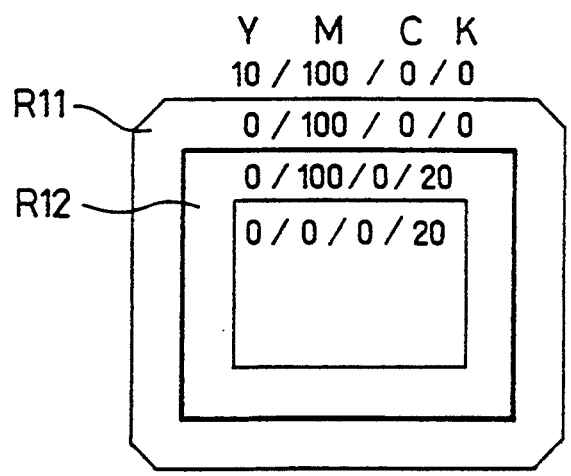

FIGS. 19(a) through 19(c) and FIGS. 20(a) through 20(c) illustrate the steps of overlapping process in gravure printing. FIG. 19(a) and FIG. 20(a) respectively show the dot percents in Y/M/C/K (%) of each region before the processing of the first step described above. In the drawings, regions R11 and R12 (FIG. 19(a)) and R21 and R22 (FIG. 20(a)) are frame regions.

FIG. 19(b) and FIG. 20(b) respectively show the dot percents of each region after the processing of the first step. In the example of FIG. 19(b), the M component has the highest priority among the color components whose dot percents are not equal to zero. Therefore the dot percent of the M component is kept at 100% in the frame region R11 whereas the dot percent of the Y component is changed from ten to zero.

In the example of FIG. 20(b), the C component has the highest priority among the color components whose dot percents are not equal to zero. Therefore the dot percent of the C component is kept at 100% in the frame region R21, and the dot percent of the Y component is changed from ten to zero. The dot percent of the M component is unchanged in the frame region R21 because the dot percent of the original region R23 of the contact region R22 adjacent to the frame region R21 is not equal to zero.

The dot percents of the M and K components are kept at 90% and 20%, respectively, in the frame region R22. The dot percent of the M component is unchanged in the frame region R22 because the dot percent of the original region R20 of the contact region R21 adjacent to the frame region R22 is not equal to zero.

At the second step of the color determination in gravure printing, each pair of frame regions are compared in respect of the highest priority of the color components whose dot percent is not equal to zero, and the frame region which has the non-zero and higher-priority color component is subject to color correction. In the example of the frame regions R11 and R12 of FIG. 19(b), only the M component is not zero in the frame region R11, and only the K component is not zero in the frame region R12. Since the K component has the higher priority than the M component, the dot percents in the frame region R12, which has the non-zero and higher-priority component K, is corrected. The frame region which has the non-zero and higher-priority component is hereinafter referred to as "high priority frame region".

The color correction is performed by utilizing non-zero color components of the contact region R11 as corrected dot percents of the high priority frame region R12. However, non-zero dot percent values of the high priority frame region are not corrected but kept intact. Namely, the dot percent of the M component of the contact region R11, that is, 100%, is utilized as a new dot percent of the M component of the high priority frame region R12. FIG. 19(c) shows the corrected dot percents of the frame regions R11 and R12.

In the example of FIG. 20(b), the M and C components are not equal to zero in the frame region R21, and the M and K components are not equal to zero in the frame region R22. Since the K component has the higher priority than the M and C components, the high priority frame region R22 is subject to the color correction. Namely, the C component of 30% of the contact region R21 adjacent to the high priority frame region R22 is utilized as a corrected C component of the frame region R22. In this example, the M component of 90% is kept intact in the frame region R22. FIG. 20(c) shows the corrected dot percents of the frame regions R21 and R22.

As described above, in the overlapping process of gravure printing, the color numbers of the original region and the contact region are determined for each frame region as is the case with the offset printing shown in FIG. 16. The above described first and the second steps are then executed for each combination of the color numbers. After the processing of the first and second steps, a new color number is allocated to each frame region while the contents of the color number table CT and the color pallet 4 are revised according to the new color numbers in the image memory 2.

Although the typical methods of allocating colors to the frame regions in offset and gravure printing are described above, another method may be specified by the operator. In other words, the step S58 of FIG. 6 can be executed according to any method specified by the operator.

When the overlapping process is completed at step S5 of FIG. 2, the program proceeds to step S6 at which the operator checks the processed image which is displayed on the color monitor 5.

When some correction is required on the displayed image, the operator executes various image corrections including retouch and partial color change at step S7. For example, the operator can change the color components or dot percents to appropriate values in the frame region or overlapping region by rewriting the contents of the color number table CT and the color pallet 4. Since each frame region has a different region number in the above embodiment, the operator can change the color of the frame region without any difficulty.

The program then goes to step S8 at which the image recording unit 11 records the final image as halftone films or printing plates.

Since the frame regions or overlapping regions R3 through R8 of the predetermined width $i_{max}$ are automatically formed on the boundaries of the original image regions R0, R1, and R2 while alternately applying the eight-neighbour window W8 and the four-neighbour window W4, frame regions can be easily formed even for the block copy image BC which includes a large number of image regions. Further, since the color of each frame region is automatically determined based on the colors of the original image region of the frame region and the contact region, the overlapping process can be executed readily for the block copy image including a large number of image regions.

Figure 21:
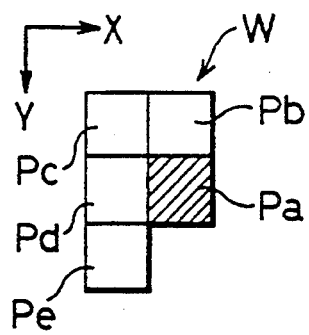
FIG. 21 shows a window used for region segmentation process.

The region segmentation is performed in the following manner, for example. FIG. 21 is a view showing a window W used in the region segmentation process. The shaded pixel Pa is a pixel-to-be-processed, and peripheral pixels Pb through Pe are in contact with the pixel Pa.

The window W is successively moved in the main scanning direction Y in such an order that a scanning line at smaller subscanning coordinate X is scanned earlier. When only the pixel Pa is black and none of the other pixels Pb through Pe is black, a new region number Nr is allocated to the pixel Pa. On the other hand, when the pixel Pa and any one of the peripheral pixels Pb through Pe are black, the region number Nr allocated to the black peripheral pixel is given to the pixel Pa as its region number Nr.

The pixel Pa in white is processed in a similar manner. That is, a new region number Nr is allocated to the pixel Pa when all of the peripheral pixels are black, and the same region number Nr is allocated to the pixel Pa as that of a white peripheral pixel when any one of the peripheral pixels is white. But when the target pixel Pa and the pixels Pc and Pe each obliquely in contact with Pa are white, and when the other pixels Pb and Pd are black, a different region number Nr is allocated to the pixel Pa from that of the pixels Pc and Pe. This makes these white pixels only obliquely contacting each other to be separate regions. As a result, a black separate region and a white separate region which obliquely intersect each other are prevented.

While the window W is moved, different region numbers Nr are successively allocated to independent regions. In such processing, there are some cases that two or more region numbers Nr are allocated to one region. FIGS. 22 through 25 are explanatory views showing processes in such a case.

Figure 22:
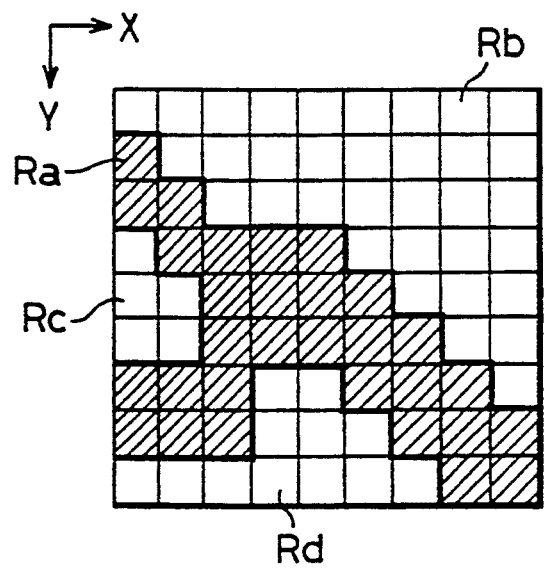

Suppose that, as shown in FIG. 22, a block copy image includes a black region Ra and three independent white regions Rb, Rc, and Rd separated by the black region Ra.

While the window W is successively moved in the main scanning direction Y in such an order that a scanning line at smaller subscanning coordinate X is scanned earlier, different region numbers Nr are allocated to the respective regions Ra through Rd.

Figure 23:
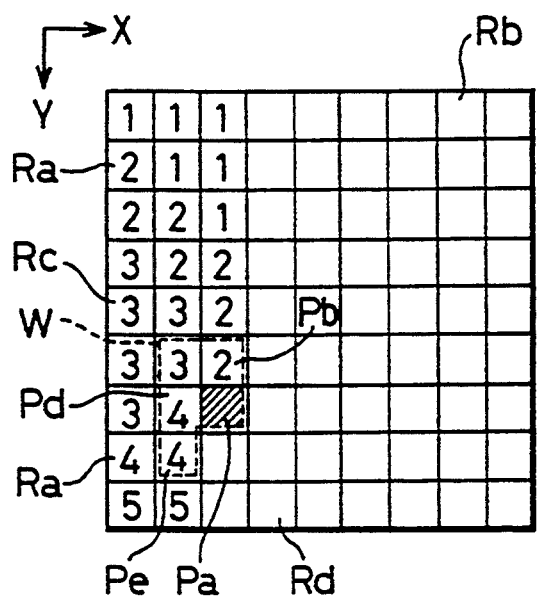
Figures 24, 25, 26:
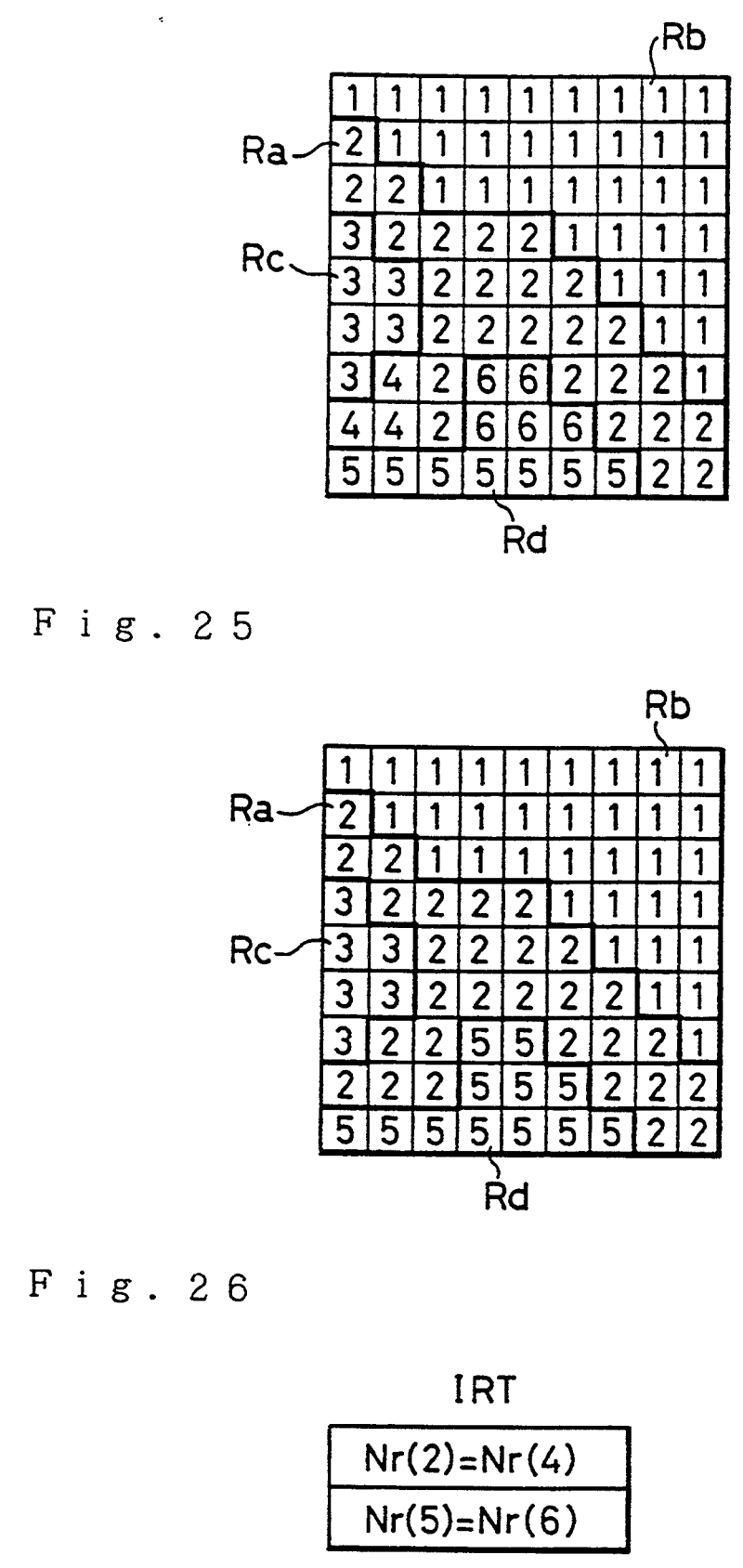

Numerals on pixels denote the region numbers Nr allocated to the pixels in FIG. 23. Pixels without numerals do not have the region numbers Nr yet. As seen in FIG. 23, the black region Ra includes pixels to which a numeral 2 is allocated as the region number Nr and those with a numeral 4. When the window is on the position shown in FIG. 23, the region number Nr on the pixel Pb in contact with the target pixel Pa is equal to 2, and those on the peripheral pixels Pd and Pe are equal to 4. Information representing that Nr=2 and Nr=4 denote the same region number is temporarily stored in the auxiliary memory 10, and the smaller region number Nr=2 is allocated to the target pixel Pa. FIG. 24 shows a resultant image, and FIG. 26 shows an identical region table IRT, both obtained as a result of such processing for all the pixels of FIG. 23.

The table IRT indicates that the region numbers Nr=2 and Nr=4 denote an identical region. The table IRT also indicates that the numbers Nr=5 and Nr=6 also denote an identical region. The table IRT is stored in the auxiliary memory 10.

The central processing unit 6 then reallocates a con, non region number (for example, the smallest region number) to pixels with different region numbers in the same image region for the image of FIG. 24 based on the table IRT. The result of such processing is shown in FIG. 25, in which each of the regions Pa through Rd has one region number Nr which is different from those of the other regions.

Although the above region segmentation is based on pixel image data, run-length image data may be processed in the similar manner.

In processing of run-length image data, run-length data of two scanning lines neighbour to each other are read out. The left peripheral pixels Pc, Pd, and Pe on the window W of FIG. 21 exist on the first scanning line closer to the origin of the coordinates, and the peripheral pixel Pb and the target pixel Pa are on the second scanning line.

The run-length data for the two scanning lines are simultaneously examined as follows. When the boundary of separate regions or separate run-lengths is located between the pixels Pc and Pd or Pd and Pe, the color of the target pixel Pa is compared with those of the peripheral pixels Pb through Pe in the same manner as above. A region number Nr is accordingly allocated to the target pixel Pa. When the boundary of separate regions is located between the peripheral pixel Pb and the target pixel Pa on the second scanning line, a region number Nr is allocated to the target pixel Pa in a similar manner.

Region segmentation is thus executed by allocating region numbers Nr to the pixels in the image on the basis of run-length data while the run-length data on the two neighbour scanning lines are compared with each other.

The region segmentation processing divides the subject image region PR into several separate regions and allocates a common region number Nr to the pixels in each separate region.

The present invention is not limited to the above embodiment, but it can be modified, for example, as follows:

The dot percent of each color component in the frame region or overlapping region can be determined by averaging the dot percent of the original region of the frame region, and the dot percent of the original region of the contact region adjacent to the frame region. The averaging can be either simple averaging or averaging with some weighing coefficients.

Although the eight-neighbour window W8 and the four-neighbour window W4 are alternately used in the embodiment, only one of the two windows can be used repeatedly. Alternatively, any specific window including a center pixel and a plurality of neighbour pixels with a predetermined priority can be used for forming frame regions. The alternate use of the eight-neighbour window W8 and the four-neighbour-window W4, however, forms a frame region of a smooth shape along the boundary of the original image regions.

Although the color components are expressed in halftone dot area rate, or dot percent, in the above embodiment, density or any other value indicating color component can be used in place of the dot percent.

According to the present invention, a pair of additional regions of a predetermined width are formed on the boundary of adjacent image regions in an original image by successively applying the neighbour window on the original image. Therefore the present invention can easily form the additional regions even in an image including a large number of image regions.

Further, since the color of the pair of the additional region are automatically determined based on the color components of the original region of the pair of the additional region, the color of the additional region can be made unobtrusive easily.

Since the invention may be embodied in other forms without departing from the scope or spirit of essential characteristics thereof, it is clearly understood that the above embodiment is only illustrative and not restrictive in any sense. The spirit and scope of the present invention is limited only by the terms of the appended claims.

What is claimed is:

1. A method of processing image data representing an original image including a plurality of image regions to create additional regions on the boundary between each pair of said plurality of image regions with the aid of a computer, said method comprising the steps of:
   (a) allocating a region number to each of said plurality of image regions;
   (b) preparing a neighbour window consisting of a plurality of pixels, said plurality of pixels including a center pixel and a plurality of adjoining pixels, each adjoining pixel allocated a predetermined priority; and
   (c) while successively shifting said neighbour window on said original image, allocating a new region number different from the aforementioned region numbers of said plurality of image regions to said center pixel located at the center of said neighbour window, to thereby produce a pair of additional regions each having the new region numbers on a respective side of said boundary between each pair of said plurality of image regions, said new region number being allocated to said center pixel on the conditions that:
      (i) said center pixel is located in one of said plurality of image regions;
      (ii) the region number of at least one of said adjoining pixels in said neighbour window is different from the region number previously allocated to said center pixel; and
      (iii) the region number of a first adjoining pixel which has the highest priority among the adjoining pixels having a different region number from the region number previously allocated to said center pixel is equal to one of the region numbers originally allocated to said plurality of image regions; while
      (iv) maintaining the region number previously allocated to said center pixel on the condition that the region number of said first adjoining pixel is different from the region numbers originally allocated to said plurality of image regions.

2. A method in accordance with claim 1, wherein said neighbour window includes a eight-neighbour window and a four-neighbour window; and the method further comprises the step of:
   (e) repeatedly executing said step (c) while alternatively using said eight-neighbour window and said four-neighbour window, to thereby form said pair of additional regions each having a width determined by the number of repetitions.

3. A method in accordance with claim 1, wherein said step (a) further comprises the step of determining color components of each of said plurality of image regions; and
   said method further comprises the step of:
   (g) correcting said color components of said pair of additional regions according to comparison between said color components of said pair of additional regions.

4. A method in accordance with claim 3, wherein said step (g) comprises the step of:
   (h) evaluating color strength of an original image region of each of said pair of additional regions according to a prescribed evaluation equation; and
   (i) correcting said color components of a first region of said pair of additional regions whose color strength is greater than a second region of said pair of additional regions.

5. A method in accordance with claim 4, wherein said step (i) comprises the step of:

(j) comparing two corresponding values of each color component for said pair of additional regions, and selecting the larger one of said two corresponding values as a corrected value of each color component for said first region.

6. An apparatus for processing image data representing an original image including a plurality of image regions to create additional regions on the boundary between each pair of said plurality of image regions, said apparatus comprising:

a first image memory for memorizing said image data; and a second image memory for memorizing at least a part of said image data on a predetermined number of scanning lines, said number of scanning lines corresponding to a width of a prescribed neighbour window consisting of a plurality of pixels, said plurality of pixels including a center pixel and a plurality of adjoining pixels, each adjoining pixel being allocated a predetermined priority;

data processing means for processing said image data in said first and second image memory, including:

region number allocation means for allocating a region number to each of said plurality of image regions;

data transfer means for reading out said at least a part of said image data from said first image memory to write in said second image memory;

means for successively shifting said neighbour window on said original image to apply said neighbour window to the image data in said second image memory, the image data in said second image memory being revised at least partly by said data transfer means every time said neighbour window reaches an end of each scanning line; and additional region forming means for allocating a new region number different from the aforementioned region numbers of said plurality of image regions to said center pixel located at the center of said neighbour window according to comparison between the region number of said center pixel and the region numbers of said adjoining pixels included in said neighbour window, to thereby produce a pair of additional regions each having the new region numbers on a respective side of said boundary between each pair of said plurality of image regions, said additional region forming means including:

means for allocating said new region number to said center pixel on the condition that said center pixel is located in one of said plurality of image regions and that the region number of at least one of said adjoining pixels in said neighbour window is different from the region number previously allocated to said center pixel; and means for allocating said new region number to said center pixel on the condition that the region number of a first adjoining pixel which has the highest priority among the adjoining pixels having a different region number from the region number previously allocated to said center pixel is equal to one of the region numbers originally allocated to said plurality of image regions, while maintaining the region number previously allocated to said center pixel on the condition that the region number of said first adjoining pixel is different from the region number originally allocated to said plurality of image regions.

7. An apparatus in accordance with claim 6, wherein said neighbour window includes a eight-neighbour window and a four-neighbour window; and said additional region forming means repeatedly executes said allocation of said new region number to said center pixel while alternatively using said eight-neighbour window and said four-neighbour window, to thereby form said pair of additional regions each having a width determined by the number of repetitions.

8. An apparatus in accordance with claim 6, wherein said region number allocation means further comprises means for determining color components of each of said plurality of image regions; and said additional region forming means further comprises:

color correction means for correcting said color components of said pair of additional regions according to comparison between said color components of said pair of additional regions.

9. An apparatus in accordance with claim 8, wherein said color correction means comprises:

first means for evaluating color strength of an original image region of each of said pair of additional regions according to a prescribed evaluation equation; and second means for correcting said color components of a first region of said pair of additional regions whose color strength is greater than a second region of said pair of additional regions.

10. An apparatus in accordance with claim 9, wherein said second means comprises:

means for comparing two corresponding values of each color component for said pair of additional regions, and selecting the larger one of said two corresponding values as a corrected value of each color component for said first region.

* * * * *